(12) United States Patent
Zhang

(10) Patent No.: US 9,625,773 B2
(45) Date of Patent: Apr. 18, 2017

(54) LIQUID CRYSTAL DISPLAY

(71) Applicant: Shenzhen China Star Optoelectronics Technology Co., Ltd., Shenzhen, Guangdong (CN)

(72) Inventor: Yanxue Zhang, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 300 days.

(21) Appl. No.: 14/001,912

(22) PCT Filed: Jun. 25, 2013

(86) PCT No.: PCT/CN2013/077922
§ 371 (c)(1),
(2) Date: Aug. 28, 2013

(87) PCT Pub. No.: WO2014/180035
PCT Pub. Date: Nov. 13, 2014

(65) Prior Publication Data
US 2014/0333870 A1    Nov. 13, 2014

(30) Foreign Application Priority Data

May 7, 2013  (CN) .......................... 2013 1 0164792

(51) Int. Cl.
*G02F 1/1345* (2006.01)
*G02F 1/1333* (2006.01)

(52) U.S. Cl.
CPC ........ *G02F 1/13452* (2013.01); *G02F 1/1333* (2013.01); *G02F 2001/133302* (2013.01);
(Continued)

(58) Field of Classification Search
CPC ... G02F 1/1533; G02F 1/13452; G02F 1/1333
See application file for complete search history.

(56) References Cited

U.S. PATENT DOCUMENTS

| | | | |
|---|---|---|---|
| 6,172,730 B1 * | 1/2001 | Fujita | 349/149 |
| 2004/0046909 A1 * | 3/2004 | Sekiguchi | 349/113 |

(Continued)

FOREIGN PATENT DOCUMENTS

CN    202720414 U    2/2013

*Primary Examiner* — Paisley L Arendt
*Assistant Examiner* — Edmond Lau
(74) *Attorney, Agent, or Firm* — Andrew C. Cheng

(57) ABSTRACT

The invention provides a liquid crystal display (LCD), which comprises: back plate; light-guiding plate, disposed on top of back plate; optical film, disposed on top of light-guiding plate; mold frame, connected to back plate to fix optical film and light-guiding plate; LCD panel, disposed on top of mold frame, comprising upper and lower glass substrates disposed oppositely, both glass substrates comprising bottom surface, top surface and side surface connecting top and bottom surfaces; driving chip, flexible circuit board, comprising metal wire and connected to LCD panel; wherein driving chip bonded to flexible circuit board, coupled through metal wire of flexible circuit board to LCD panel; joint of bottom and side surfaces of upper glass substrate disposed with first routing gap, flexible circuit board connected to LCD panel routing through first routing gap. The LCD can effectively hide COF in liquid crystal display to maximize borderless LCD design.

20 Claims, 4 Drawing Sheets

(52) U.S. Cl.
CPC ............ *G02F 2001/133317* (2013.01); *G02F 2201/56* (2013.01)

(56) References Cited

U.S. PATENT DOCUMENTS

| | | | |
|---|---|---|---|
| 2004/0246397 A1* | 12/2004 | Kang et al. | 349/58 |
| 2008/0136994 A1* | 6/2008 | Lee et al. | 349/58 |
| 2008/0291608 A1* | 11/2008 | Fan | 361/679 |
| 2010/0147582 A1* | 6/2010 | Shin et al. | 174/535 |
| 2012/0050958 A1* | 3/2012 | Sanford et al. | 361/679.01 |
| 2012/0062823 A1* | 3/2012 | Takatani et al. | 349/96 |
| 2012/0113352 A1* | 5/2012 | Bae et al. | 349/58 |
| 2012/0224117 A1* | 9/2012 | Miyazaki et al. | 349/58 |
| 2013/0076696 A1* | 3/2013 | Shin | G06F 3/0428 345/175 |

\* cited by examiner

LIQUID CRYSTAL DISPLAY

BACKGROUND OF THE INVENTION

1. Field of the Invention

The present invention relates to the field of liquid crystal display techniques, and more particularly to a liquid crystal display.

2. The Related Arts

Because the liquid crystal display (LCD) provides the advantages of light weight, reduced thickness, and low power consumption, the liquid crystal display finds wide applications in the many fields. As manufacturing technology for the liquid crystal display improves, the borderless LCD becomes a trend.

However, in the current design of the borderless LCD, the liquid crystal display panel comprises two glass substrates, with the lower glass substrate usually larger than the upper substrate. The chip-on-film (COF), i.e., the driving chip fixed to the flexible circuit board, of the liquid crystal display panel is bonded to the OLB of the lower glass substrate, i.e., the area where the lower glass substrate is wider than the upper glass substrate. As a result, the COF of the current LCD is difficult to hide effectively in the LCD, which makes the design of the borderless LCD difficult.

SUMMARY OF THE INVENTION

The technical issue to be addressed by the present invention is to provide a borderless liquid crystal display, able to hide the COF effectively.

The present invention provides a liquid crystal display, which comprises: a back plate; a light-guiding plate, disposed on top of the back plate; an optical film, disposed on top of the light-guiding plate; a mold frame, fixedly connected to the back plate so as to fix the optical film and the light-guiding plate; a liquid crystal display panel, fixedly disposed on top of the mold frame, and comprising an upper glass substrate and a lower glass substrate disposed oppositely, both the upper and lower glass substrates comprising a bottom surface, a top surface and side surface connecting the top and the bottom surfaces; a driving chip, a flexible circuit board, comprising metal wire and connected to the liquid crystal display panel; wherein the driving chip being bonded to the flexible circuit board, and coupled through the metal wire of the flexible circuit board to the liquid crystal display panel; the joint of the bottom surface and the side surface of the upper glass substrate being disposed with a first routing gap, and the flexible circuit board connected to the liquid crystal display panel routing through the first routing gap.

According to a preferred embodiment of the present invention, the driving chip and the flexible circuit board are bonded through the chip on film (COF) packaging manner.

According to a preferred embodiment of the present invention, the upper glass substrate has the same size as the lower glass substrate.

According to a preferred embodiment of the present invention, the joint of the top surface and the side surface of the lower glass substrate is disposed with a yielding gap, located corresponding to the location of the first routing gap and the yielding gap is connected to the joint of the bottom surface and the side surface of the lower glass substrate.

According to a preferred embodiment of the present invention, the side surface of the mold frame is disposed with concave trench for accommodating the flexible circuit board; the liquid crystal display further comprises a border frame part, which further comprising: a shielding part and two connecting parts formed by extending from one end of the shielding part towards two sides; the connecting parts are fixed to the side corresponding to the side surface of the mold frame; the shielding part is latched to the concave trench to shield the flexible circuit board exposed in the concave trench.

According to a preferred embodiment of the present invention, the connecting parts are adhered fixedly to the side of the mold frame.

According to a preferred embodiment of the present invention, the connecting parts are adhered fixedly to the side of the mold frame by double-sided duct tape.

According to a preferred embodiment of the present invention, the side of the mold frame is disposed with socket; the connecting parts comprise a protruding part corresponding to the socket; the protruding part inserts into the socket and fixedly engaged to the socket so that the connecting parts are fixed to the side of the mold frame.

According to a preferred embodiment of the present invention, the protruding part inserts into the socket and is adhered fixedly to the socket by double-sided duct tape.

According to a preferred embodiment of the present invention, the protruding part is disposed with hook; the brim of the socket protrudes inward to form protruding platform; the hook is fixedly engaged to the protruding platform so that the protruding part is fixedly engaged to the socket.

The present invention provides a liquid crystal display, which comprises: a back plate; a light-guiding plate, disposed on top of the back plate; an optical film, disposed on top of the light-guiding plate; a mold frame, fixedly connected to the back plate so as to fix the optical film and the light-guiding plate; a liquid crystal display panel, fixedly disposed on top of the mold frame, and comprising an upper glass substrate and a lower glass substrate disposed oppositely, both the upper and lower glass substrates comprising a bottom surface, a top surface and side surface connecting the top and the bottom surfaces; a driving chip, a flexible circuit board, comprising metal wire and connected to the liquid crystal display panel; wherein the driving chip being bonded to the flexible circuit board, and coupled through the metal wire of the flexible circuit board to the liquid crystal display panel; the joint of the bottom surface and the side surface of the upper glass substrate being disposed with a first routing gap; the joint of the top surface and the side surface of the upper glass substrate being disposed with a second routing gap; the location of the second routing gap being corresponding to the location of the first routing gap and the second routing gap being connected to the first routing gap; the flexible circuit board connected to the liquid crystal display panel routing through the connected first routing gap and second routing gap; the upper glass substrate further comprising a transparent plate, disposed in the connected first routing gap and second routing gap, for filling up the connected first routing gap and second routing gap to level after the flexible circuit board finishing routing.

According to a preferred embodiment of the present invention, the transparent plate is made of PMMA.

According to a preferred embodiment of the present invention, the upper glass substrate has the same size as the lower glass substrate.

According to a preferred embodiment of the present invention, the side surface of the mold frame is disposed with concave trench for accommodating the flexible circuit board; the liquid crystal display further comprises a border frame part, which further comprising: a shielding part and two connecting parts formed by extending from one end of the shielding part towards two sides; the connecting parts are fixed to the side corresponding to the side surface of the mold frame; the shielding part is latched to the concave trench to shield the flexible circuit board exposed in the concave trench.

According to a preferred embodiment of the present invention, the connecting parts are adhered fixedly to the side of the mold frame.

According to a preferred embodiment of the present invention, the connecting parts are adhered fixedly to the side of the mold frame by double-sided duct tape.

According to a preferred embodiment of the present invention, the side of the mold frame is disposed with socket; the connecting parts comprise a protruding part corresponding to the socket; the protruding part inserts into the socket and fixedly engaged to the socket so that the connecting parts are fixed to the side of the mold frame.

According to a preferred embodiment of the present invention, the protruding part inserts into the socket and is adhered fixedly to the socket by double-sided duct tape.

According to a preferred embodiment of the present invention, the protruding part is disposed with hook; the brim of the socket protrudes inward to form protruding platform; the hook is fixedly engaged to the protruding platform so that the protruding part is fixedly engaged to the socket.

The liquid crystal display of the present invention requires no front frame and realizes borderless design. The present invention can effectively hide the COF in the liquid crystal display to maximize the borderless LCD design.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

Figure 1:
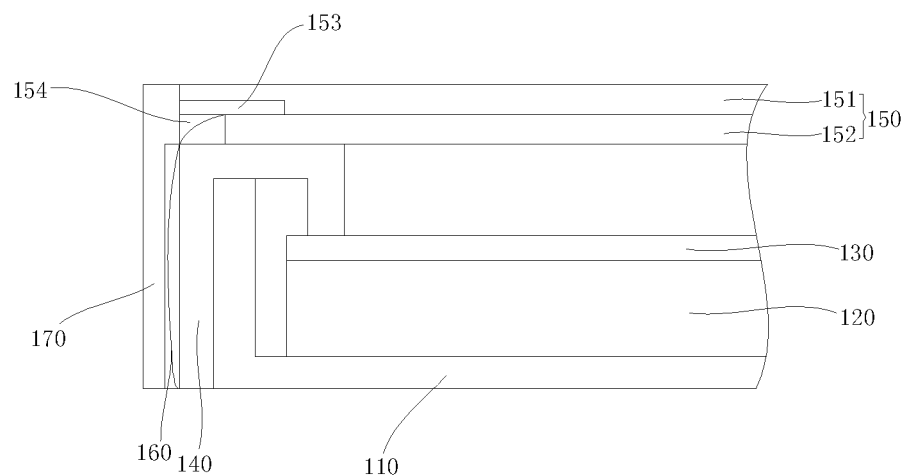
FIG. 1 is a partial cross-sectional view showing the structure of a liquid crystal display according to the first embodiment of the present invention.

The following describes the embodiments of the present invention in details. The embodiments are depicted in the drawings, wherein the same number indicates the same part. The following refers to the drawings and embodiments for detailed description of the present invention. In the following, to prevent the unnecessary details of commonly known structures and/or functions from cluttering the concept of the present invention, the details of commonly known structures and/or functions are omitted.

Figure 2:
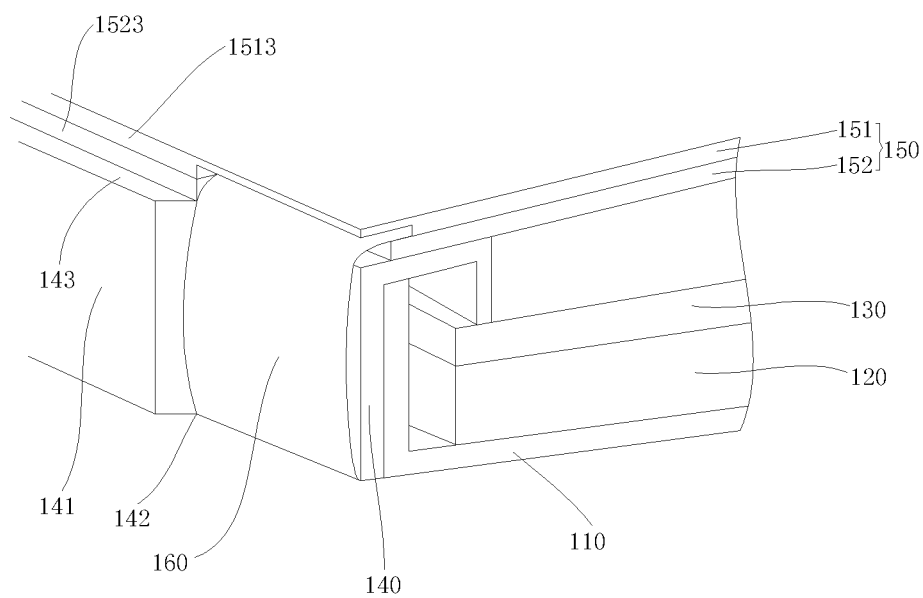
FIG. 2 is a partial three-dimensional view showing the structure of a liquid crystal display according to the first embodiment of the present invention.
Figure 3:
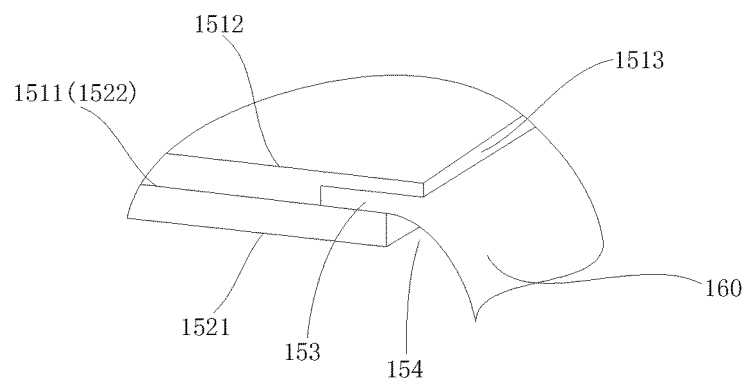
FIG. 3 is a partial schematic view showing the structure of a liquid crystal display according to the first embodiment of the present invention.
Figure 4:
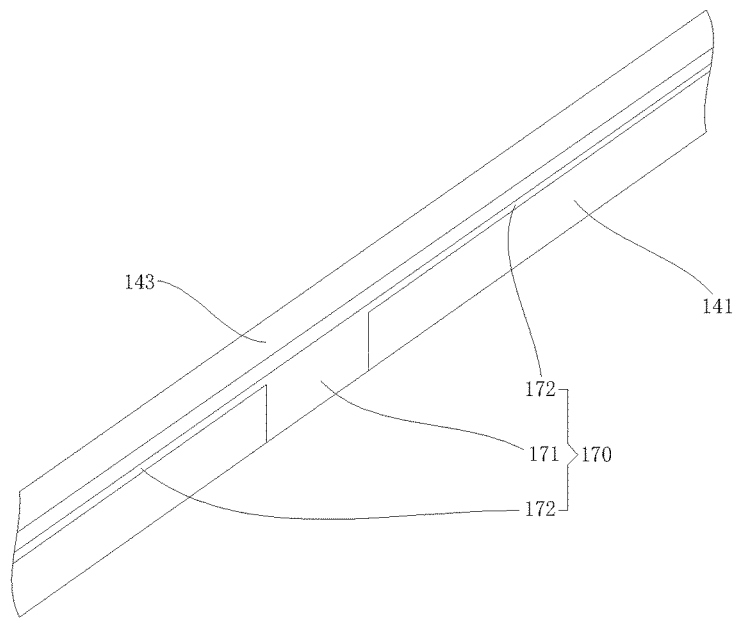
FIG. 4 is a schematic view showing the fixing of the border frame part and the mold frame according to the first embodiment of the present invention.

FIG. 1 is a partial cross-sectional view showing the structure of a liquid crystal display according to the first embodiment of the present invention; FIG. 2 is a partial three-dimensional view showing the structure of a liquid crystal display according to the first embodiment of the present invention; FIG. 3 is a partial schematic view showing the structure of a liquid crystal display according to the first embodiment of the present invention; and FIG. 4 is a schematic view showing the fixing of the border frame part and the mold frame according to the first embodiment of the present invention. FIG. 2 does not show the border frame part in order to show a clearer view of the structure of the side of the mold frame.

As shown in FIGS. 1-4, a liquid crystal display according to the first embodiment of the present invention comprises: a back plate 110, a light-guiding plate 120, an optical film 130, a mold frame 140, a liquid crystal display panel 150, a chip on film (COF) 160 and a border frame part 170.

The light-guiding plate 120 is disposed on top of the back plate 110; the optical film 130 disposed on top of the light-guiding plate 120; and the mold frame 140 is fixedly connected to the back plate 110 so as to fix the optical film 130 and the light-guiding plate 120. The light-guiding plate 120 is for propagating the light from the light source, the optical film 130 is for processing the light propagated from the light-guiding plate 120 to become a plane light source with more uniform luminance.

The COF 160 comprises a driving chip and a flexible circuit board. The driving chip is bonded to the flexible circuit board. The flexible circuit board further comprises metal wires and is connected to the liquid crystal display 150. The driving chip is coupled to the liquid crystal display panel 150 through the metal wire of the flexible circuit board.

It should be noted that the liquid crystal display of the present invention requires no front frame. In the instant embodiment, the liquid crystal display panel 150 is directly fixed on top of the mold frame 140 to receive the light processed by the optical film 130 to display images. The liquid crystal display panel 150 comprises an upper glass substrate 151 and a lower glass substrate 152, disposed oppositely. The upper glass substrate 151 comprises a bottom surface 1511, a top surface 1512 and side surface 1513 connecting the top surface 1511 and the bottom surface 1512. The lower glass substrate 152 comprises a bottom surface 1521, a top surface 1522 and side surface 1523. Specifically, the bottom surface 1521 of the lower glass substrate 152 is fixed to the mold frame 140 and the bottom surface 1511 of the upper glass substrate 151 is disposed tightly against the top surface 1522 of the lower glass substrate. The joint of the bottom surface 1511 and the side surface 1513 of the upper glass substrate 151 is disposed with a routing gap 153. The COF 160 connected to the liquid crystal display panel 150 routes through the routing gap 153 to effectively hide the COF 160 in the routing gap 153. In addition, the routing gap 153 is located at the joint of the bottom surface 1511 at any end and the side surface 1513 of the upper glass substrate 151.

To rid of the OLB area of the lower glass substrate 152 (i.e., the area where the lower glass substrate 152 is wider than the upper glass substrate 151) to achieve hiding the OLB area of the lower glass substrate 152, the upper glass substrate 151 is preferably to have the same size as the lower glass substrate 152.

In addition, the joint of the top surface 1522 and the side surface 1523 of the lower glass substrate 1521 is disposed with a yielding gap 154, located corresponding to the location of the routing gap 153 and the yielding gap 154 is connected to the joint of the bottom surface 1521 and the side surface 1523 of the lower glass substrate 152 so as to facilitate the assembly of COF 160 during assembling liquid crystal display 1.

To yield to the COF 160 assembly and avoid partially exposing the COF 160 to outside, the side surface 141 of the mold frame 140 is disposed with concave trench 142 for accommodating the exposed part of the COF 160. The border frame part 170 further comprises: a shielding part 171 and two connecting parts 172 formed by extending from one end of the shielding part 171 towards two sides. The two connecting parts 172 are fixed respectively to the side 143 corresponding to the side surface 141 of the mold frame 140. The shielding part 171 is latched to the concave trench 142 to shield the COF 160 exposed in the concave trench 142.

The following describes the two connecting parts 172 fixed to the side 143 in details.

Figure 5:
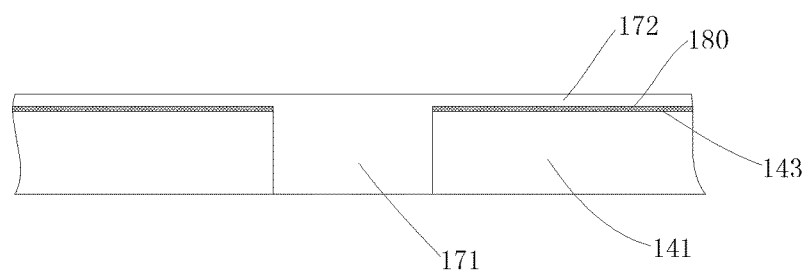
FIG. 5 is a schematic view showing the fixing of the connecting part of the border frame part to the side of the mold frame according to the first embodiment of the present invention.

FIG. 5 is a schematic view showing the fixing of the connecting part of the border frame part to the side of the mold frame according to the first embodiment of the present invention.

As shown in FIG. 5, the two connecting parts 172 are adhered respectively fixedly to the side 143 of the mold frame. In the instant embodiment, the two connecting parts 172 are adhered respectively fixedly to the side 143 of the mold frame by double-sided duct tape 180. But the present invention is not restricted to this embodiment. The adhesion can also be achieved by other adhesive means, such as, glue.

Figure 6:
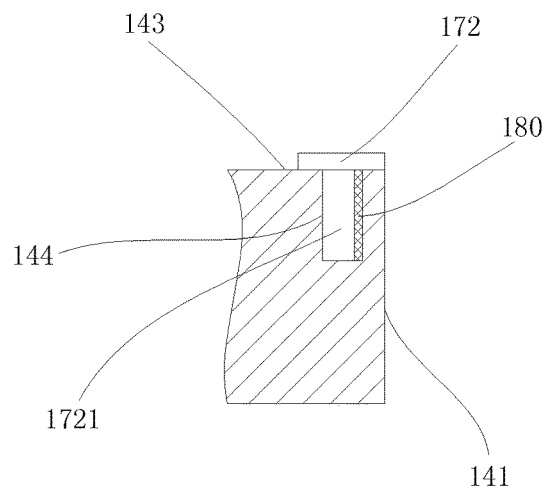
FIG. 6 is a schematic view showing the another fixing of the connecting part of the border frame part to the side of the mold frame according to the first embodiment of the present invention.

FIG. 6 is a schematic view showing the another fixing of the connecting part of the border frame part to the side of the mold frame according to the first embodiment of the present invention.

As shown in FIG. 6, the instant embodiment differs from the embodiment in FIG. 5 in that the side 143 of the mold frame is disposed with two sockets 144. Each connecting part 172 comprises a protruding part 1721 corresponding to the socket 144. The protruding part 1721 inserts into the socket 144 and fixedly engaged to the socket 144 so that the connecting parts 172 are fixed to the side 143 of the mold frame. In the instant embodiment, the protruding part 1721 inserts into the socket 144 and is adhered fixedly to the socket 144 by double-sided duct tape 180.

Figure 7:
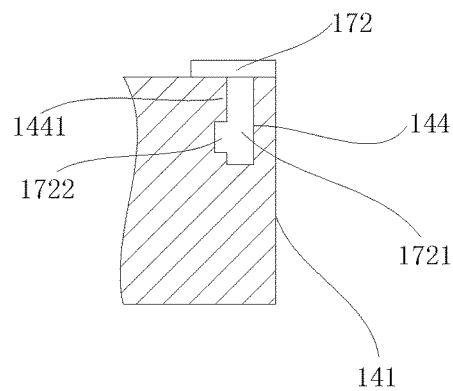
FIG. 7 is a schematic view showing another fixing of the connecting part of the border frame part to the side of the mold frame according to the first embodiment of the present invention.

FIG. 7 is a schematic view showing another fixing of the connecting part of the border frame part to the side of the mold frame according to the first embodiment of the present invention.

As shown in FIG. 7, the instant embodiment differs from the embodiment in FIG. 6 in that the protruding part 1721 is disposed with hook 1722; the brim of the socket 144 protrudes inward to form protruding platform 1441; the hook 1721 is fixedly engaged to the protruding platform 1441 so that the protruding part 1721 is fixedly engaged to the socket 144.

Second Embodiment

The description of the part of the second embodiment identical to the first embodiment will not be repeated here. The second embodiment differs from the first embodiment in that the routing gap of the liquid crystal display panel is changed, specifically as follows.

Figure 8:
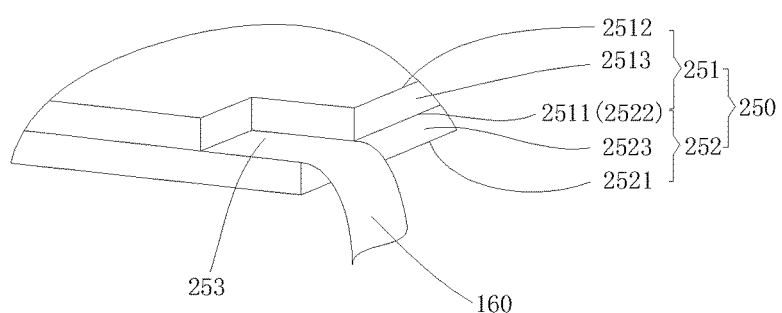
FIG. 8 is a partial schematic view showing the structure of a liquid crystal display according to the second embodiment of the present invention.
Figure 9:
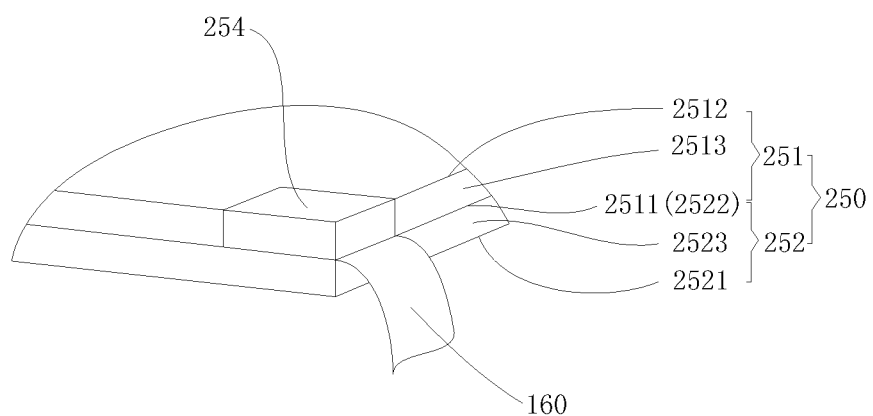
FIG. 9 is a partial schematic view showing the structure of a liquid crystal display with transparent plate according to the second embodiment of the present invention.

FIG. 8 is a partial schematic view showing the structure of a liquid crystal display according to the second embodiment of the present invention. FIG. 9 is a partial schematic view showing the structure of a liquid crystal display with transparent plate according to the second embodiment of the present invention.

Compared to the first embodiment, the liquid crystal display panel 250 in the second embodiment comprises an upper glass substrate 251 and a lower glass substrate 252, disposed oppositely. The upper glass substrate 251 comprises a bottom surface 2511, a top surface 2512 and side surface 2513 connecting the top surface 2511 and the bottom surface 2512. The lower glass substrate 252 comprises a bottom surface 2521, a top surface 2522 and side surface 2523. The joint of the bottom surface 2511 and the side surface 2513 of the upper glass substrate 251 is disposed with a routing gap 253. The routing gap 253 is connecting to the joint of the top surface 2512 and the side surface 2513 of the upper glass substrate 251. The COF 160 connected to the liquid crystal display panel 250 routes through the routing gap 253 to effectively hide the COF 160 in the routing gap 253. Compared to the routing gap in the first embodiment, the routing gap 253 in the second embodiment is larger to optimally accommodate the assembly of COF 160. In addition, the routing gap 253 is located at the joint of the bottom surface 2511 at any end and the side surface 2513 of the upper glass substrate 251.

Furthermore, to fill to level the routing gap 253 after finishing routing and improve esthetics, a transparent material 254 can be used to fill up the routing gap 253 after finishing routing. In the instant embodiment, the transparent material 254 can be Polymethyl Methacrylate (PMMA). But the present invention is not restricted to such embodiment. For example, the transparent material 254 can also be Polycarbonate (PC), Polythylene Terephthalate (PET), or Polybutyleneterephthalate (PBT).

In summary, the liquid crystal display of the present invention requires no front frame and realizes borderless design. The present invention can effectively hide the COF in the liquid crystal display to maximize the borderless LCD design.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. A liquid crystal display, which comprises:
   a back plate;
   a light-guiding plate, disposed on top of the back plate without any structural elements between;
   an optical film, disposed on top of the light-guiding plate;
   a mold frame, fixedly connected to the back plate so as to fix the optical film and the light-guiding plate;
   a liquid crystal display panel, fixedly disposed on top of the mold frame, and comprising an upper glass substrate and a lower glass substrate disposed oppositely, both the upper and lower glass substrates comprising a bottom surface, a top surface and a side surface connecting the top and the bottom surfaces;
   a driving chip;
   a flexible circuit board, comprising metal wire and connected to the liquid crystal display panel;
   wherein the driving chip being bonded to the flexible circuit board, and coupled through the metal wire of the flexible circuit board to the liquid crystal display panel; the joint of the bottom surface and the side surface of the upper glass substrate being disposed with a first routing gap, and the flexible circuit board connected to the liquid crystal display panel routing through the first routing gap,
   wherein the top surface of the lower glass substrate faces the bottom surface of the upper glass substrate, the first routing gap is disposed between the top surface of the lower glass substrate and the top surface of the upper glass substrate, and the top surface of the upper glass substrate covers the first routing gap.

2. The liquid crystal display as claimed in claim 1, wherein the driving chip and the flexible circuit board are bonded through the chip on film (COF) packaging manner.

3. The liquid crystal display as claimed in claim 1, wherein the upper glass substrate has the same size as the lower glass substrate.

4. The liquid crystal display as claimed in claim 2, wherein the upper glass substrate has the same size as the lower glass substrate.

5. The liquid crystal display as claimed in claim 3, wherein the joint of the top surface and the side surface of the lower glass substrate is disposed with a yielding gap, located corresponding to the location of the first routing gap and the yielding gap is connected to the joint of the bottom surface and the side surface of the lower glass substrate.

6. The liquid crystal display as claimed in claim 1, wherein the side surface of the mold frame is disposed with concave trench for accommodating the flexible circuit board; the liquid crystal display further comprises a border frame part, which further comprising: a shielding part and two connecting parts formed by extending from one end of the shielding part towards two sides; the connecting parts are fixed to the side corresponding to the side surface of the mold frame; the shielding part is latched to the concave trench to shield the flexible circuit board exposed in the concave trench.

7. The liquid crystal display as claimed in claim 6, wherein the connecting parts are adhered fixedly to the side of the mold frame.

8. The liquid crystal display as claimed in claim 7, wherein the connecting parts are adhered fixedly to the side of the mold frame by double-sided duct tape.

9. The liquid crystal display as claimed in claim 6, wherein the side of the mold frame is disposed with socket; the connecting parts comprise a protruding part corresponding to the socket; the protruding part inserts into the socket and fixedly engaged to the socket so that the connecting parts are fixed to the side of the mold frame.

10. The liquid crystal display as claimed in claim 9, wherein the protruding part inserts into the socket and is adhered fixedly to the socket by double-sided duct tape.

11. The liquid crystal display as claimed in claim 9, wherein the protruding part is disposed with hook; the brim of the socket protrudes inward to form protruding platform; the hook is fixedly engaged to the protruding platform so that the protruding part is fixedly engaged to the socket.

12. A liquid crystal display, which comprises:
   a back plate;
   a light-guiding plate, disposed on top of the back plate without any structural elements between;
      an optical film, disposed on top of the light-guiding plate;
      a mold frame, fixedly connected to the back plate so as to fix the optical film and the light-guiding plate;
      a liquid crystal display panel, fixedly disposed on top of the mold frame, and comprising an upper glass substrate and a lower glass substrate disposed oppositely, both the upper and lower glass substrates comprising a bottom surface, a top surface and a side surface connecting the top and the bottom surfaces;
   a driving chip;
   a flexible circuit board, comprising metal wire and connected to the liquid crystal display panel;
      wherein the driving chip being bonded to the flexible circuit board, and coupled through the metal wire of the flexible circuit board to the liquid crystal display panel; the joint of the bottom surface and the side surface of the upper glass substrate being disposed with a first routing gap; the joint of the top surface and the side surface of the upper glass substrate being disposed with a second routing gap; the location of the second routing gap being corresponding to the location of the first routing gap and the second routing gap being connected to the first routing gap; the flexible circuit board connected to the liquid crystal display panel routing through the connected first routing gap and second routing gap; and
      the upper glass substrate further comprising a transparent plate, disposed in the connected first routing gap and second routing gap, for filling up the connected first routing gap and second routing gap to level after the flexible circuit board finishing routing,
      wherein the top surface of the lower glass substrate faces the bottom surface of the upper glass substrate, the first routing gap is disposed between the top surface of the lower glass substrate and the top surface of the upper glass substrate, and the top surface of the upper glass substrate covers the first routing gap.

13. The liquid crystal display as claimed in claim 12, wherein the transparent plate is made of PMMA.

14. The liquid crystal display as claimed in claim 12, wherein the upper glass substrate has the same size as the lower glass substrate.

15. The liquid crystal display as claimed in claim 12, wherein the side surface of the mold frame is disposed with concave trench for accommodating the flexible circuit board; the liquid crystal display further comprises a border frame part, which further comprising: a shielding part and two connecting parts formed by extending from one end of the shielding part towards two sides; the connecting parts are fixed to the side corresponding to the side surface of the mold frame; the shielding part is latched to the concave trench to shield the flexible circuit board exposed in the concave trench.

16. The liquid crystal display as claimed in claim 15, wherein the connecting parts are adhered fixedly to the side of the mold frame.

17. The liquid crystal display as claimed in claim 16, wherein the connecting parts are adhered fixedly to the side of the mold frame by double-sided duct tape.

18. The liquid crystal display as claimed in claim 15, wherein the side of the mold frame is disposed with socket; the connecting parts comprise a protruding part corresponding to the socket; the protruding part inserts into the socket and fixedly engaged to the socket so that the connecting parts are fixed to the side of the mold frame.

19. The liquid crystal display as claimed in claim 18, wherein the protruding part inserts into the socket and is adhered fixedly to the socket by double-sided duct tape.

20. The liquid crystal display as claimed in claim 18, wherein the protruding part is disposed with hook; the brim of the socket protrudes inward to form protruding platform; the hook is fixedly engaged to the protruding platform so that the protruding part is fixedly engaged to the socket.

* * * * *